US006454838B1

(12) United States Patent
Xu et al.

(10) Patent No.: US 6,454,838 B1
(45) Date of Patent: Sep. 24, 2002

(54) SIX BED PRESSURE SWING ADSORPTION PROCESS WITH FOUR STEPS OF PRESSURE EQUALIZATION

(75) Inventors: Jianguo Xu, Wrightstown; Edward Landis Weist, Jr., Macungie, both of PA (US)

(73) Assignee: Air Products and Chemicals, Inc., Allentown, PA (US)

( * ) Notice: Subject to any disclaimer, the term of this patent is extended or adjusted under 35 U.S.C. 154(b) by 10 days.

(21) Appl. No.: 09/598,613

(22) Filed: Jun. 21, 2000

(51) Int. Cl.⁷ .............................................. B01D 53/047
(52) U.S. Cl. ............................. 95/98; 95/100; 95/105; 95/121; 95/130; 95/139; 95/140; 95/143
(58) Field of Search ..................... 95/96–98, 100–103, 95/130, 139, 140, 105, 117, 121, 143

(56) References Cited

U.S. PATENT DOCUMENTS

| 3,986,849 | A |   | 10/1976 | Fuderer et al. ................. 55/25 |
| 4,077,779 | A | * | 3/1978 | Sircar et al. ............... 95/101 X |
| 4,375,363 | A | * | 3/1983 | Fuderer ........................ 95/97 |
| 4,468,237 | A | * | 8/1984 | Fuderer ........................ 95/100 |
| 4,475,929 | A | * | 10/1984 | Fuderer ........................ 95/97 |
| 4,512,778 | A | * | 4/1985 | Simonet et al. ................ 95/100 |
| 4,512,780 | A | * | 4/1985 | Fuderer ........................ 95/100 |
| 4,589,888 | A | * | 5/1986 | Hiscock et al. ............... 95/100 |
| 4,726,816 | A | * | 2/1988 | Fuderer ........................ 95/98 |
| 4,732,578 | A | * | 3/1988 | Benkmann .................. 95/98 X |
| 4,834,780 | A |   | 5/1989 | Benkmann ..................... 55/26 |
| 4,981,499 | A | * | 1/1991 | Hay et al. ..................... 95/100 |
| 5,174,796 | A | * | 12/1992 | Davis et al. .................... 95/100 |
| 5,294,247 | A | * | 3/1994 | Scharpf et al. ........... 95/103 X |
| 5,656,065 | A | * | 8/1997 | Kalbassi et al. ............. 95/98 X |
| 6,007,606 | A | * | 12/1999 | Baksh et al. .................... 95/98 |

* cited by examiner

Primary Examiner—Robert H. Spitzer
(74) Attorney, Agent, or Firm—Geoffrey L. Chase

(57) ABSTRACT

A pressure swing adsorption process includes providing a pressure swing adsorption apparatus having six beds, and equalizing a pressure of each of the six beds in four steps, wherein at all times during the process, at least one of the six beds is providing offgas. The process is particularly suitable for purifying hydrogen from a feed gas mixture containing hydrogen and at least one of methane, carbon dioxide, carbon monoxide, nitrogen and water vapor.

16 Claims, No Drawings

SIX BED PRESSURE SWING ADSORPTION PROCESS WITH FOUR STEPS OF PRESSURE EQUALIZATION

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

This invention relates to pressure swing adsorption (PSA) processes, and more particularly to such processes employing multiple adsorbent beds and multiple pressure equalization steps.

PSA processes are well-known for the separation of gas mixtures that contain components with different adsorbing characteristics. For example, hydrogen production via pressure swing adsorption ($H_2$ PSA) is a multi-million dollar industry supplying high purity hydrogen for chemical producing industries, metals refining and other related industries.

In a typical PSA system, a multicomponent gas is passed to at least one of multiple adsorption beds at an elevated pressure to adsorb at least one strongly sorbed component while at least one component passes through. In the case of $H_2$ PSA, $H_2$ is the most weakly adsorbed component which passes through the bed. At a defined time, the feed step is discontinued and the adsorption bed is depressurized with flow co-current to the direction of the feed in one or more steps which permits essentially pure $H_2$ product to exit the bed with a high recovery of the most weakly adsorbed component, $H_2$. Then a countercurrent desorption step is carried out, followed by countercurrent purge and repressurization.

U.S. Pat. No. 3,986,849 to Fuderer et al. discloses PSA processes employing at least seven adsorbent beds, and at least three steps of pressure equalization per bed. This patent teaches that an undesirable reversion of the desorbate profile from the inlet to the discharge end of the bed is substantially reduced when at least three pressure equalization stages are employed. Fuderer et al. does not disclose any embodiments comprising performing four pressure equalization steps in a six-bed apparatus.

U.S. Pat. No. 4,834,780 to Benkmann discloses six-bed cycles with "four- or five-stage cocurrent expansions" (i.e., four or five co-current depressurization steps), and only one adsorber on feed at any time. Two types of six-bed cycles are disclosed—one having three steps of pressure equalization and the other having four steps of pressure equalization. In the cycle with four steps of pressure equalization, the supply of offgas (gas from the feed ends of the beds during the counter-current blowdown and purge steps) is discontinuous, i.e., there are times when no offgas is supplied from the PSA system during the cycle. Discontinuous offgas flow is not desirable in processes in which the offgas is used continuously, such as in hydrogen PSA processes in which the offgas is used as fuel to the steam reformer.

Table 1 shows a six-bed cycle with three steps of pressure equalization, which follows Benkmann's teaching while offgas is supplied continuously:

TABLE 1

| A | A | A | A | 1 | 2 | 3 | I | P | P | B | B | G | G | 3' | I | I | 2' | I | I | 1' | R | R | R |
|---|---|---|---|---|---|---|---|---|---|---|---|---|---|----|---|---|----|---|---|----|---|---|---|
| 1' | R | R | R | A | A | A | A | 1 | 2 | 3 | I | P | P | B | B | G | G | 3' | I | I | 2' | I | I |
| I | 2' | I | I | 1' | R | R | R | A | A | A | A | 1 | 2 | 3 | I | P | P | B | B | G | G | 3' | I |
| G | G | 3' | I | I | 2' | I | I | 1' | R | R | R | A | A | A | A | 1 | 2 | 3 | I | P | P | B | B |
| P | P | B | B | G | G | 3' | I | I | 2' | I | I | 1' | R | R | R | A | A | A | A | 1 | 2 | 3 | I |
| 1 | 2 | 3 | I | P | P | B | B | G | G | 3' | I | I | 2' | I | I | 1' | R | R | R | A | A | A | A |

Despite the foregoing developments, it would be desirable to provide an improved PSA process which increases production and/or recovery per bed in a multiple bed system.

All references cited herein are incorporated herein by reference in their entireties.

BRIEF SUMMARY OF THE INVENTION

The invention provides a pressure swing adsorption process comprising providing a pressure swing adsorption apparatus having six beds, and equalizing a pressure of each of said six beds in four steps. At all times during the process, at least one of the six beds is providing offgas.

BRIEF DESCRIPTION OF SEVERAL VIEWS OF THE DRAWINGS

Not applicable.

DETAILED DESCRIPTION OF THE INVENTION

In embodiments of the invention, the bed that co-currently provides purge gas to another bed also undergoes counter-current depressurization. Table 2 shows a cycle chart in accordance with such embodiments of the invention:

TABLE 2

| | | | | | | | | | | | | | | | | | | | | | | | |
|---|---|---|---|---|---|---|---|---|---|---|---|---|---|---|---|---|---|---|---|---|---|---|---|
| A | A | A | A | 1 | 2 | I | 3 | P | P | B' | B | G | G | 4' | 3' | I | 2' | I | I | 1' | R | R | R |
| 1' | R | R | R | A | A | A | A | 1 | 2 | I | 3 | P | P | B' | B | G | G | 4' | 3' | I | 2' | I | I |
| I | 2' | I | I | 1' | R | R | R | A | A | A | A | 1 | 2 | I | 3 | P | P | B' | B | G | G | 4' | 3' |
| G | G | 4' | 3' | I | 2' | I | I | 1' | R | R | R | A | A | A | A | 1 | 2 | I | 3 | P | P | B' | B |
| P | P | B' | B | G | G | 4' | 3' | I | 2' | I | I | 1' | R | R | R | A | A | A | A | 1 | 2 | I | 3 |
| 1 | 2 | I | 3 | P | P | B' | B | G | G | 4' | 3' | I | 2' | I | I | 1' | R | R | R | A | A | A | A |

In the first step of this cycle, a feed mixture is first sent to the feed end of the bed. The more adsorbable component(s) is (are) adsorbed by the adsorbent, while the less adsorbable component(s) pass(es) through the bed and exit(s) the bed from the product end. This step takes ⅙ of the cycle time and is indicated by "A" on the cycle chart.

The bed then undergoes the first providing pressure equalization step, indicated by "1" on the cycle chart. During this step, the bed provides gas from the product end to a bed that receives pressure equalization (indicated by "1'" on the cycle chart) until the pressures in the providing and receiving pressure equalization beds are essentially equal. Then the bed undergoes the second providing pressure equalization step, indicated by "2" on the cycle chart. During this step, the bed provides gas from the product end to a bed that receives pressure equalization (indicated by "2'" on the cycle chart) until the pressures in the providing and receiving pressure equalization beds are essentially equal. Each of the above two providing pressure equalization steps takes approximately 1/24 of the cycle time.

Then the bed is idle for approximately 1/24 of the cycle time, indicated by "I" in the cycle chart.

Then the bed undergoes the third providing pressure equalization step, indicated by "3" on the cycle chart. During this step, the bed provides gas from the product end to a bed that receives pressure equalization (indicated by "3'" on the cycle chart) until the pressures in the providing and receiving pressure equalization beds are essentially equal.

Then the bed provides purge gas, indicated by "P" on the cycle chart. During this time, the gas exiting the product end of the bed is used to purge the bed receiving purge, indicated by "G" in the cycle chart. This takes approximately 1/12 of the cycle time.

Then the bed is depressurized from both the feed and product ends. This step takes approximately 1/24 of the cycle time and is indicated by "B" on the cycle chart. The gas from the feed end is rich in the more adsorbable component. It may be recovered as a product or disposed as waste gas, and in the case of hydrogen purification of a steam reformate of hydrocarbons, it is usually used as fuel for the reformer. The gas from the product end is used for the bed receiving pressure equalization (indicated by step "4'").

Then the product end is closed while the counter-current depressurization on the feed end continues. This step takes about 1/24 of the cycle time and is indicated by "B'" on the cycle chart.

Then the bed receives counter-current purge gas from the product end, and allows the gas rich in the more adsorbable component(s) to elute from the feed end of the bed. This step takes approximately 1/12 of the cycle time and is indicated by "G" on the cycle chart.

The bed then receives pressure equalization gas from the product end. This step takes approximately 1/24 of the cycle time and is indicated by "4'" on the cycle chart.

Then the bed undergoes the third receiving pressure equalization gas step by receiving gas from the product end. This step takes approximately 1/24 of the cycle time and is indicated by "3'" on the cycle chart.

Then the bed is idle for approximately 1/24 of the cycle time as is indicated by "I" on the cycle chart.

Then the bed undergoes the second receiving pressure equalization step. This step takes approximately 1/24 of the cycle time and is indicated by "2'" on the cycle chart.

Then the bed is idle for 1/12 of the cycle time, indicated by "I" on the cycle chart.

Then the bed receives from the product end pressure equalization gas from the bed at step "1" from the product end of the latter bed, and at the same time receives product gas, also from the product end, or feed gas from the feed end. This step takes 1/24 of the cycle time and is indicated by "1'" on the cycle chart.

The bed further receives product gas from the product end and/or feed gas from the feed end for ⅛ of the cycle time before the cycle repeats itself. This step is indicated by "R" on the cycle chart.

The six beds are staggered. One bed is ⅙ of the cycle time behind another in the cycle sequence so that there is always one bed receiving feed and providing product.

The cycle chart in Table 3 shows an alternative embodiment of the invention, wherein the purge time is doubled:

TABLE 3

| A | A | A | A | 1 | 2 | 3 | P | P | P' | P | B | B | G | G | G | G | 4' | 3' | 2' | 1' | R | R | R |
|---|---|---|---|---|---|---|---|---|---|---|---|---|---|---|---|---|---|---|---|---|---|---|---|
| 1' | R | R | R | A | A | A | A | 1 | 2 | 3 | P | P | P' | P | B | B | G | G | G | G | 4' | 3' | 2' |
| G | 4' | 3' | 2' | 1' | R | R | R | A | A | A | A | 1 | 2 | 3 | P | P | P' | P | B | B | G | G | G |
| B | G | G | G | G | 4' | 3' | 2' | 1' | R | R | R | A | A | A | A | 1 | 2 | 3 | P | P | P' | P | B |
| P | P' | P | B | B | G | G | G | G | 4' | 3' | 2' | 1' | R | R | R | A | A | A | A | 1 | 2 | 3 | P |
| 1 | 2 | 3 | P | P | P' | P | B | B | G | G | G | G | 4' | 3' | 2' | 1' | R | R | R | A | A | A | A |

This sequence of this cycle is the same as that of Table 2 except for the following three differences:

(1) The pressure equalization gas from the bed at step "2" goes to a gas storage tank, and the gas from the tank is subsequently passed into the product end of the bed at step "2'" in the cycle of Table 3. This does not occur in the embodiment of Table 2.

(2) The gas for receiving pressure equalization step "4'" comes from the bed in a step (indicated by "P'") when the bed is also co-currently providing gas for purge of another bed in the cycle. In the cycle of Table 2, the gas for receiving pressure equalization step "4'" comes from a bed that is being blowndown.

(3) The time for purge is 1/6 of the cycle time, doubling the 1/12 purge time found in Table 2. As a consequence, the idle time is eliminated in the cycle of Table 3, and the provide purge time is also doubled.

In this cycle, there are six "cocurrent expansion phases" using Benkmann's nomenclature: the first provide pressure equalization step "1", the second provide pressure equalization step "2", the third provide pressure equalization step "3", the first provide purge step "P", the simultaneous provide purge and provide fourth pressure equalization step "P'", and the second provide purge step "P".

It will be apparent to those skilled in the art that the invention is not limited to the cycle times exemplified above. For example, in the cycle according to Table 3, the time for steps "1" and "1'" can be reduced by t (where t is zero or a positive number that is smaller than 1/24 of the cycle time), and the time saved from these two steps can be used in steps following them (steps "2" and "R").

In all embodiments of the invention, the preferred product gas is hydrogen, but the invention is not limited thereto.

Preferably, the feed mixture comprises hydrogen and at least one member selected from the group consisting of methane, carbon dioxide, carbon monoxide, nitrogen and water vapor. In embodiments, the feed gas is obtained by steam reforming of hydrocarbons, such as natural gas or naphtha.

In other embodiments, the feed gas is obtained by partial oxidation of hydrocarbons, such as natural gas or naphtha. In a number of these embodiments, the partial oxidation can occur in the presence of at least one catalyst, such as in autothermal reforming.

In embodiments wherein the oxygen used for oxidation is provided by an ion transport membrane, it is preferred that the ion transport membrane be integrated with a reactor in which the partial oxidation occurs.

In embodiments, at least a part of the counter-current depressurization overlaps in time with co-current depressurization.

The invention will be illustrated in more detail with reference to the following Examples, but it should be understood that the present invention is not deemed to be limited thereto.

EXAMPLE 1

This example shows why the invention is advantageous over the prior art cycle shown in Table 1, which has only three steps of pressure equalization.

Hydrogen with 1 ppm of CO is to be produced from a feed mixture containing 0.5% nitrogen, 6.0% methane, 16.0% carbon dioxide, 3.5% carbon monoxide, and 74.0% hydrogen. The feed mixture is fed from a PSA unit at a pressure of 30 atm (absolute).

Computer simulations specifying the foregoing parameters were run for each of the cycles shown in Tables 1, 2 and 3. The results are shown in Table 4.

TABLE 4

| Cycle | Table 1 (prior art) | Table 2 | Table 3 |
|---|---|---|---|
| Recovery | 88.8 | 87.3 | 87.7 |
| Relative Capacity ($H_2$ production) | 1.0 | 1.03 | 1.11 |
| Bed Diameter | 9.5 ft | 10.0 ft | 9.5 ft |

The cycle time is the same for all these cycles. Each bed is 22.4 ft tall, and is packed with carbon and zeolite layers (carbon near the feed end, zeolite adsorbent near the product end) with what is considered to be an optimal split at the feed conditions.

It can be seen from Table 4 that the recovery is significantly higher using the cycles of Tables 2 and 3 instead of the cycle of Table 1. The bed capacity is essentially the same between the cycles in Table 1 and Table 2. Hydrogen recovery is a very important economical factor in hydrogen production.

It should also be mentioned that due to the fact that the time for purge is longer using the cycle in Table 3, it is possible to use taller beds, or smaller particles in the bed without causing too high a pressure during the purge step. This is advantageous in increasing single train capacity of the PSA unit, and/or provides other advantages relating to the use of smaller size beads.

While the invention has been described in detail and with reference to specific examples thereof, it will be apparent to one skilled in the art that various changes and modifications can be made therein without departing from the spirit and scope thereof.

What is claimed is:

1. A pressure swing adsorption process comprising providing a pressure swing adsorption apparatus having six beds, and equalizing a pressure of each of said six beds in four steps, wherein at all times during said process, at least one of said six beds is being counter-currently depressurized or counter-currently purged to provide an offgas from a feed end of said at least one bed.

2. The process of claim 1, further comprising:
   (a) feeding a feed gas to a feed end of one of said six beds, wherein said feed gas contains at least one more adsorbable component and at least one less adsorbable component;
   (b) adsorbing said at least one more adsorbable component to said one bed;
   (c) passing said at least one less adsorbable component from a product end of said one bed;
   (d) co-currently depressurizing to provide gas for pressure equalization;
   (e) counter-currently depressurizing to desorb and remove from said one bed at least a portion of said at least one more adsorbable component;
   (f) counter-currently purging to remove an additional portion of said at least one more adsorbable component from said one bed;
   (g) receiving gas for counter-current pressure equalization; and 9. The process of claim 6, wherein oxygen used in said partial oxidation is provided by an ion transport membrane.

10. The process of claim 9, wherein said ion transport membrane is integrated with a partial oxidation reactor.

11. The process of claim 2, wherein at least a part of said counter-current depressurizing overlaps in time with said co-current depressurizing.

12. The process of claim 2, wherein gas from said co-current depressurizing step is passed through a tank before being used to repressurize another bed.

13. The process of claim 12, wherein said tank receives gas from a product end of a bed undergoing a second providing pressure equalization step, and provides gas to a product end of a bed undergoing a second receiving pressure equalization step.

14. The process of claim 1, represented by the following cycle chart:

| A  | A  | A  | A  | 1  | 2  | I  | 3  | P  | P  | B' | B  | G  | G  | 4' | 3' | I  | 2' | I  | I  | 1' | R  | R  | R  |
|----|----|----|----|----|----|----|----|----|----|----|----|----|----|----|----|----|----|----|----|----|----|----|----|
| 1' | R  | R  | R  | A  | A  | A  | A  | 1  | 2  | I  | 3  | P  | P  | B' | B  | G  | G  | 4' | 3' | I  | 2' | I  | I  |
| I  | 2' | I  | I  | 1' | R  | R  | R  | A  | A  | A  | A  | 1  | 2  | I  | 3  | P  | P  | B' | B' | G  | G  | 4' | 3' |
| G  | G  | 4' | 3' | I  | 2' | I  | I  | 1' | R  | R  | R  | A  | A  | A  | A  | 1  | 2  | I  | 3  | P  | P  | B' | B  |
| P  | P  | B' | B  | G  | G  | 4' | 3' | I  | 2' | I  | I  | 1' | R  | R  | R  | A  | A  | A  | A  | 1  | 2  | I  | 3  |
| 1  | 2  | I  | 3  | P  | P  | B' | B  | G  | G  | 4' | 3' | I  | 2' | I  | I  | 1' | R  | R  | R  | A  | A  | A  | A  |

(h) further receiving gas to make a pressure of said one bed and a feed gas pressure of said feed gas substantially equal,
wherein said counter-currently depressurizing and said counter-currently purging provide said offgas from said feed end of said one bed.

3. The process of claim 2, wherein said at least one less adsorbable component is hydrogen.

4. The process of claim 2, wherein said feed gas is a mixture comprising hydrogen and at least one member selected from the group consisting of methane, carbon dioxide, carbon monoxide, nitrogen and water vapor.

5. The process of claim 2, wherein said feed gas comes from steam reforming of hydrocarbons.

wherein A is adsorption, 1 is providing gas for a first step of pressure equalization, 2 is providing gas for a second step of pressure equalization, 3 is providing gas for a third step of pressure equalization, P is providing purge gas, B is counter-current depressurization, B' is counter-current and co-current depressurization, G is counter-current purge, I is idle, 4' is receiving gas for a fourth step of pressure equalization, 3' is receiving gas for the third step of pressure equalization, 2' is receiving gas for the second step of pressure equalization, 1' is receiving gas for the first step of pressure equalization and simultaneously receiving product gas for repressurization, and R is repressurizing with at least one of product gas and feed gas.

15. The process of claim 1, represented by the following cycle chart:

| A  | A  | A  | A  | 1  | 2  | 3  | P  | P  | P' | P  | B  | B  | G  | G  | G  | 4' | 3' | 2' | 1' | R  | R  | R  |
|----|----|----|----|----|----|----|----|----|----|----|----|----|----|----|----|----|----|----|----|----|----|----|
| 1' | R  | R  | R  | A  | A  | A  | A  | 1  | 2  | 3  | P  | P  | P' | P  | B  | B  | G  | G  | G  | 4' | 3' | 2' |
| G  | 4' | 3' | 2' | 1' | R  | R  | R  | A  | A  | A  | A  | 1  | 2  | 3  | P  | P  | P' | P  | B  | B  | G  | G  |
| B  | G  | G  | G  | G  | 4' | 3' | 2' | 1' | R  | R  | R  | A  | A  | A  | A  | 1  | 2  | 3  | P  | P  | P' | P  |
| P  | P' | P  | B  | B  | G  | G  | G  | 4' | 3' | 2' | 1' | R  | R  | R  | A  | A  | A  | A  | 1  | 2  | 3  | P  |
| 1  | 2  | 3  | P  | P  | P' | P  | B  | B  | G  | G  | G  | 4' | 3' | 2' | 1' | R  | R  | R  | A  | A  | A  | A  |

6. The process of claim 2, wherein said feed gas comes from partial oxidation of hydrocarbons.

7. The process of claim 6, wherein said partial oxidation occurs in a presence of at least one catalyst.

8. The process of claim 7, wherein said partial oxidation occurs in autothermal reforming.

wherein A is adsorption, 1 is providing gas for a first step of pressure equalization, 2 is providing gas for a second step of pressure equalization, 3 is providing gas for a third step of pressure equalization, P' is providing purge gas and simultaneously providing gas for a fourth step of pressure equalization, P is providing purge gas, B is counter-current depressurization, G is counter-current purge, 4' is receiving gas for the fourth step of pressure equalization, 3' is receiving gas for the third step of pressure equalization, 2' is receiving gas for the second step of pressure equalization, and 1' is receiving gas for the first step of pressure equalization and simultaneously receiving product gas for re-pressurization, and R is repressurizing with at least one of product gas and feed gas.

16. The process of claim 1, wherein said each of said six beds is 1/6 of a cycle time behind another of said six beds, such that there is always one bed receiving feed and providing product.

* * * * *